US00RE35015E

United States Patent [19]

Cans Urchaga

[11] E Patent Number: Re. 35,015

[45] Reissued Date of Patent: Aug. 15, 1995

[54] WIRE WINDING AND TYING MACHINE WITH MAGNETIZED HANKING HEAD

[75] Inventor: Miguel Cans Urchaga, Barbastro, Spain

[73] Assignee: Hanscom-Madex, A.I.E., Providence, R.I.

[21] Appl. No.: 257,825

[22] Filed: Jun. 6, 1994

Related U.S. Patent Documents

Reissue of:

[64] Patent No.: 5,311,721
Issued: May 17, 1994
Appl. No.: 982,472
Filed: Nov. 27, 1992

[30] Foreign Application Priority Data

Nov. 29, 1991 [ES] Spain ..... 9102674

[51] Int. Cl.[6] ..... B65B 13/28; B65B 63/04

[52] U.S. Cl. ..... 53/118; 53/139.4; 53/590; 100/16; 100/31

[58] Field of Search ..... 53/116, 118, 138.8, 53/139.4, 582, 590, 529, 528; 100/8, 16, 31, 916

[56] References Cited

U.S. PATENT DOCUMENTS

| | | | |
|---|---|---|---|
| 1,261,589 | 4/1918 | Mogan et al. | 53/139.4 X |
| 3,126,684 | 3/1964 | Bower | 53/138.8 |
| 3,263,597 | 8/1966 | Stychinsky et al. | 100/31 |
| 3,480,220 | 11/1969 | Hanscom . | |
| 3,614,849 | 10/1971 | Croucher | 53/528 X |
| 3,906,701 | 9/1975 | McIntyre . | |
| 4,106,264 | 8/1978 | Hanscom . | |
| 4,252,157 | 2/1981 | Ohnishi | 100/31 X |
| 4,253,289 | 3/1981 | Cole et al. | 53/590 X |
| 4,406,109 | 9/1983 | Butler | 53/118 X |
| 4,466,227 | 8/1984 | Hanscom . | |

*Primary Examiner*—Linda B. Johnson
*Attorney, Agent, or Firm*—Barlow & Barlow, Ltd.

[57] ABSTRACT

A wire winding and tying machine useful in the winding of steel wire strands or the like includes a tie stock dispenser that delivers a pre cut length of tie stock to a platform. A banking unit picks up the tie stock and delivers it to a position above pre wound strands. The hanking unit includes rockable arms that press the tie stock ends about the wound strands to a position to engage a twister that winds the tie stock about the strands.

7 Claims, 5 Drawing Sheets

WIRE WINDING AND TYING MACHINE WITH MAGNETIZED HANKING HEAD

Matter enclosed in heavy brackets [ ] appears in the original patent but forms no part of this reissue specification; matter printed in italics indicates the additions made by reissue.

BACKGROUND OF THE INVENTION

The present invention relates to improvements in wire winding and tying machines, wherein electrical wire strands and other similar materials are automatically wound or reeled into hanks and individually tied.

Various types of tying and hanking apparatus have enjoyed commercial success. Compressing a wound hank for subsequent tying is seen in Hanscom U.S. Pat. No. 4,106,264 and McIntyre U.S. Pat. No. 3,906,701. Tying devices are seen in Hanscorm U.S. Pat Nos. 3,480,220 and 4,466,227. Of critical importance is the reliability of such devices and the speed that they operate.

A primary goal of the present invention is to provide the gripping clamp of the wound hanks close to the hanking device which is provided with magnets to hold the tying wires, and clamping arms that grip the hank and displace the ends of the tying wires to engage a twister located below the winding plate into which are fitted winding fingers.

SUMMARY OF THE INVENTION

A winding device includes a reel holding the ferrous wire for tying hanks, which wire is fastened to a slidable carriage, the travel of which is adjustable to provide the required length for tying the desired wound hank.

For winding the strand, one of its ends is fixed to the winding plate, using a clamp that presses the wire against a winding finger, rotation of said winding plate causing the hank to be formed between a pair of diametrically opposed winding fingers.

After the hank is wound and tied, the clamp body rises, carrying the hank on its arms which are opened in an area of its travel, releasing the hank and the device remaining ready for a new cycle.

The ferrous wire runs over a guide to a cutting blade which is actuated by a cylinder. When the ferrous wire a cut, he free length, for tying the wound hank is fixed to a magnetized member, and is shifted to a magnetized base of the hanking unit. The clamp arms of the unit then automatically move down and position the ferrous wire ends into engagement with a twister which, upon rotation, will cause the ferrous wire free ends to be twisted about the hank.

DESCRIPTION OF THE INVENTION

Improvements in the winding and tying machines are basically directed to the following members: The ferrous wire tie stock and hanking unit for the cut ferrous wire tie stock has clamp arms that are actuated by a cylinder that is actuated when the hanking head is moved downwardly, the clamp arms close about the wound strand. The hanking head is guided by a central shaft extending from the clamp arms support plate and normally is urged downwardly by springs toward the winding plate. When the hank has been wound, the ferrous wire tie stock is positioned there over on magnets on the lower face of the hanking head. The hanking head goes down, the clamp arms close beneath the hank directing the tie stock downwardly by means of some extensions of the clamp arms.

The clamp arms, on being closed, are pressing against the hank sides, inserting the ferrous wire tie stock into the working area of the tying means so that when the tying means are rotated, the tie stock free ends are mutually braided and the hank subsequently tied.

The hank winding plate is provided with a pair of diametrically opposed grooves, into which are tilted fingers, and the hank is wound about the fingers.

The ferrous wire dispenser for tying the hanks comprises a straightener of the ferrous wire tic stock coming from a reel, the wire going through a groove of a stop and a carriage to which it is clamped.

From said carriage the ferrous wire is directed to a groove located in the two support plates of the respective mutually orthogonally positioned cutting blades. Near the pair of cutting blades is found the cut ferrous wire tie stock transferor to the hankering head.

The carriage where the ferrous wire is clamped is inked to a motor cylinder, in a way such that when the cylinder is activated and the cylinder plunger travels a predetermined distance supplying ferrous wire tie stock for tying the hank.

At the time the tying ferrous wire is provided, one of the cutting blades is actuated and the cutting of the ferrous wire is performed according to the required length.

The transferring unit comprises some magnets gripping the ferrous wire tie stock and a moveable base whereon the wire is resting which is reciprocated by a cylinder. Upon activation of said cylinder, the ferrous wire tie stock is shifted upwardly by the base and transferred to the hanking unit which now moves to a position over the winding plate.

In this way, while the banking unit is moving above to the winding plate with the hank, and tying and ejecting the hank, the dispenser then begins a new cycle to supply new tie stock having ferrous wire up to the transferror, whereby a remarkable time saving is achieved when the two operations are independently and jointly performed.

The tie stock twister shaft is found in a concentric position as regards to the winding plate and has an indexing unit in the form of an escape wheel, with as many teeth as the twister has arms, fixed thereto.

A trigger is anchored to the winding plate shaft to engage the escape wheel teeth. When the winding plate shaft rotates, driven by a motor, the escape wheel contacted by the trigger rotates with the plate. Since braking of the winding plate shaft is smooth, the twister shaft always stops alike in a position associated to said winding plate. The purpose of the trigger and escape wheel is to stop in a way that the tie stock ends can easily be located within the twister operating range.

To supplement the description subsequently being disclosed, and to help in a better understanding of the characteristics involved, the present descriptive specification is accompanied with a drawing set, which figures illustratively and non-exhaustively are showing the most relevant details of the invention.

DESCRIPTION OF THE PREFERRED EMBODIMENT

Figure 3:
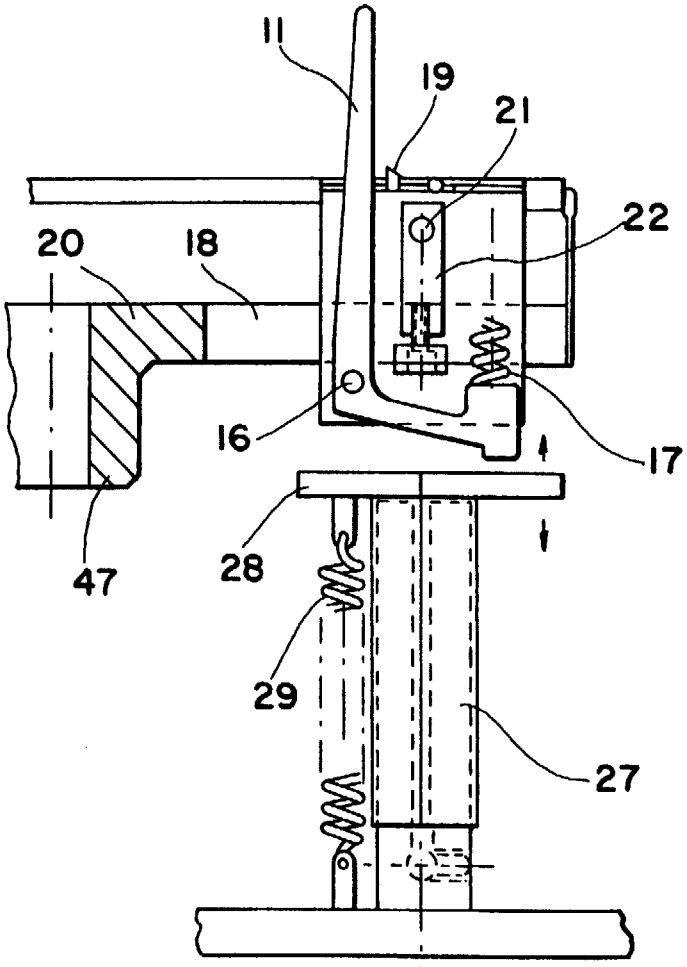
FIG. 3 shows a detailed half sectional view of the winding plate, with one winding finger positioned in a groove of said plate.

Returning to the above discussed figures and according to the adopted numbering, the improvements in the wire winding and tying machines can be appreciated as basically directed to the following: The banking unit comprises a body plate 1 where the clamp arms 2 are pivotally fitted. The hanking head is guided by a shaft 15 fastened to the body plate, springs 14 downwardly pushing the hanking head away from the body plate 1. The head has a top plate 5, magnets 6 and a central undercutting 7 into which the already cut tie stock 8 is received for transport up to the winding plate 20 (FIG. 3).

Figure 1:
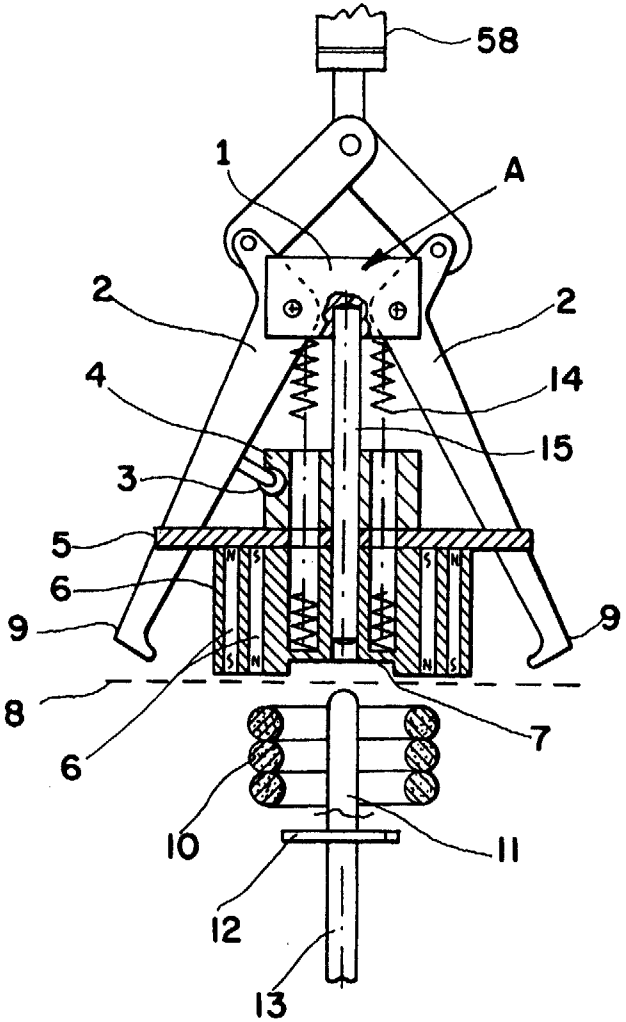
FIG. 1 shows an elevation view of the hanking unit, with the hanking body holding the hank.
Figure 4:
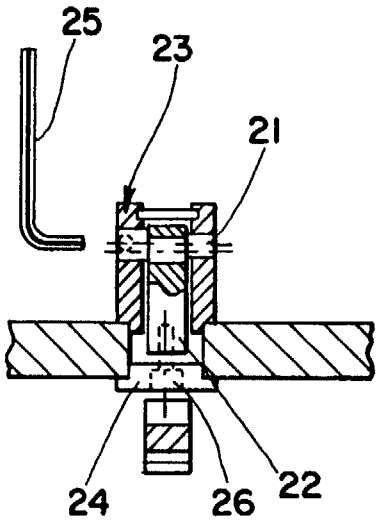
FIG. 4 shows a detailed view of the winding block anchoring.

After the hank 10 has been wound, the clamp arms are positioned there over (position A, FIG. 1) the ferrous wire 8, being positioned centrally to the undercutting 7, so that the ferrous wire remains orthogonally positioned.

Figure 2:
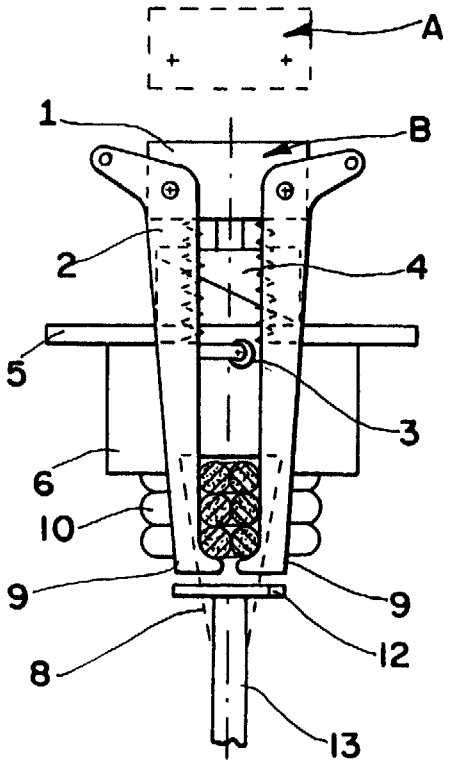
FIG. 2 shows an elevation view of the hanking unit positioned with the clamp arms fastened to the hank, with the hanking body pressing there over, and the tying wire seen laterally arranged to the hank for twisting the wire ends.

The clamp arms automatically reciprocate downwardly by actuation of cylinder 58 and the linkage (position B, FIG. 2), and the arms 2 are closed beneath the hank by the cam action of cam wheel 3, which rides on a side wall of hanking head 4, while the banking head presses against the hank 10 under urgent of the springs 14 and the ferrous wire is thereby engaged to the central undercutting 7 of the magnetized area and the ferrous wire folding is thus made easier.

The arms 2, when closed, are pressing on the hank sides and inserting the ferrous wire ends into the working area of the tying device 12, by means of the protrusions 9 so that when the tying device 12 is rotated, the mutual braiding of the free ends of the ferrous wire can be performed with the subsequent tying of the hank 10.

The tying device 12 is interlocked to its shaft 13 and the hank tying is achieved by this shaft rotation.

The hank winding plate 20 (FIG. 3) is provided with a pair of diametrically opposed grooves 18 (only being shown), and the winding devices are made up winding fingers 11 pivoted at 16 to the plate 20 and urged radially outward by a spring 17. The positioning of the finger 11 is controlled by an adjustable stop 19.

The end of the strand to be wound will generally remain fixed between the winding finger and said adjustable stop 19. Downwardly from the L-shaped finger is a cylinder 27 having a plate 28 maintained out of contact with the finger by the action of a spring 29.

After the hank 10 has been wound, the flange 28 interlocked with the free end of the plunger of the cylinder 27, contacts the lower portion of the L-shaped finger 11 rocking the finger II so that the already tied hank can be easily releasable.

In the beginning of a new cycle, the plunger of cylinder 27 will retract, releasing the L-shaped finger 11 and leaving the plate 20 free for the winding of a new hank.

Figure 9:
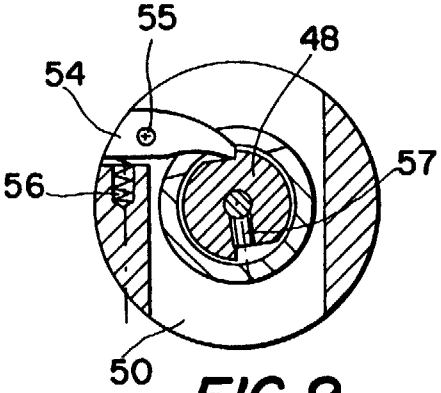
FIG. 9 shows a cross-sectioned view, taken on line 9—9 of FIG. 8, wherein is seen how the rotatively linked trigger is interlocked with the winding plate shaft and is engaged to the teeth of the escape wheel.
Figure 10:
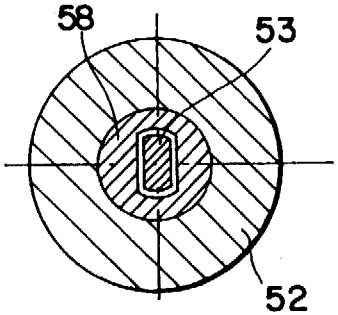
FIG. 10 shows a cross-sectioned view, taken on line 10—10 of FIG. Ii, wherein is seen how the escape wheel cylindrical extension is interlocked to the motor coupling.

Anchoring of a winding block 23 (FIG. 9) is performed within the groove 18 by using a toggle 24 and connection rod 22 and an adjustable screw 26, the egocentric shaft 21 being rotated with a key 25 or other means.

Figure 5:
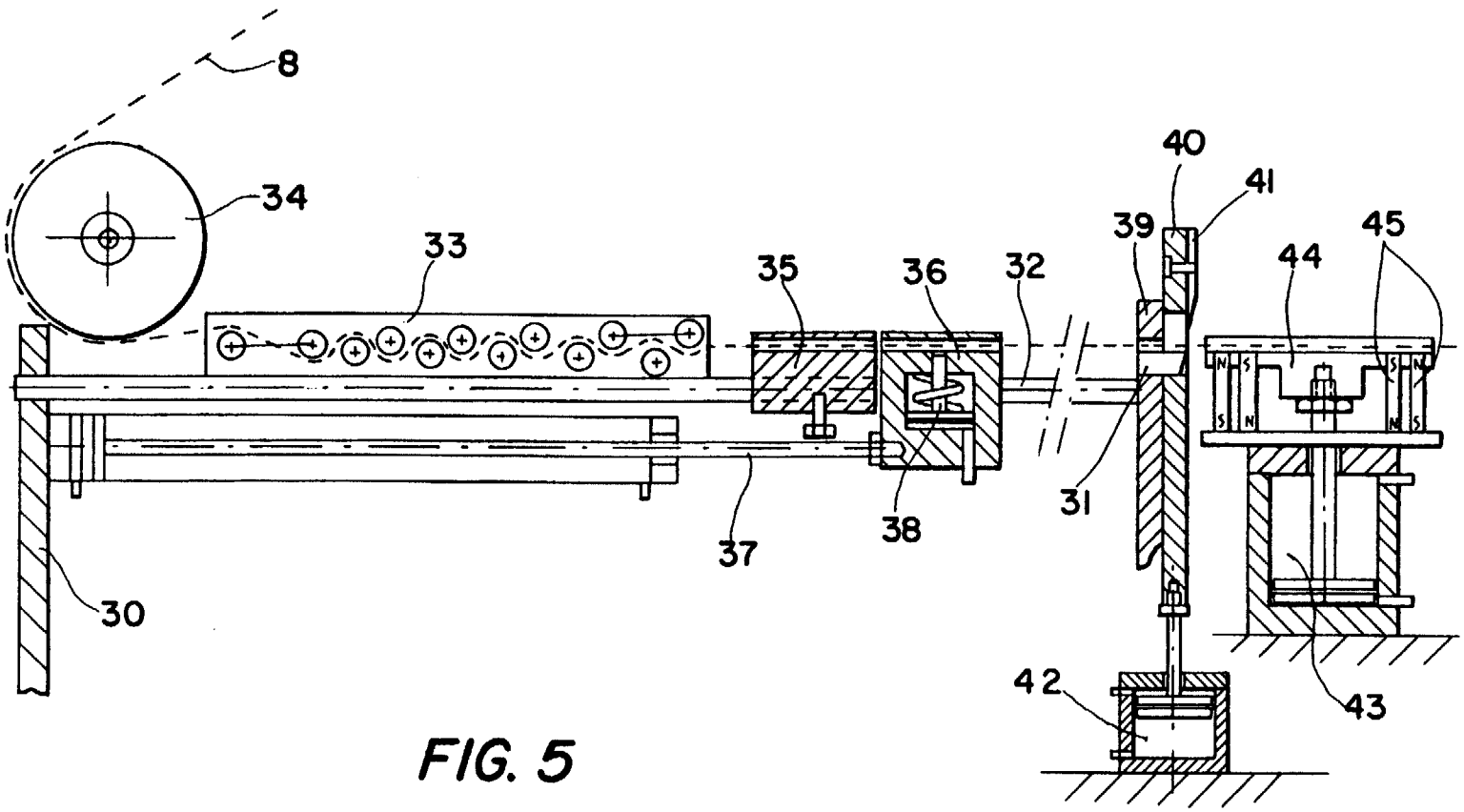
FIG. 5 shows an elevation view of the tie stock dispenser including the straightener, the stop, the delivery carriage driven by a cylinder, the orthogonally positioned cutting blades and the tie stock transferror to the hanking unit.
Figure 7:
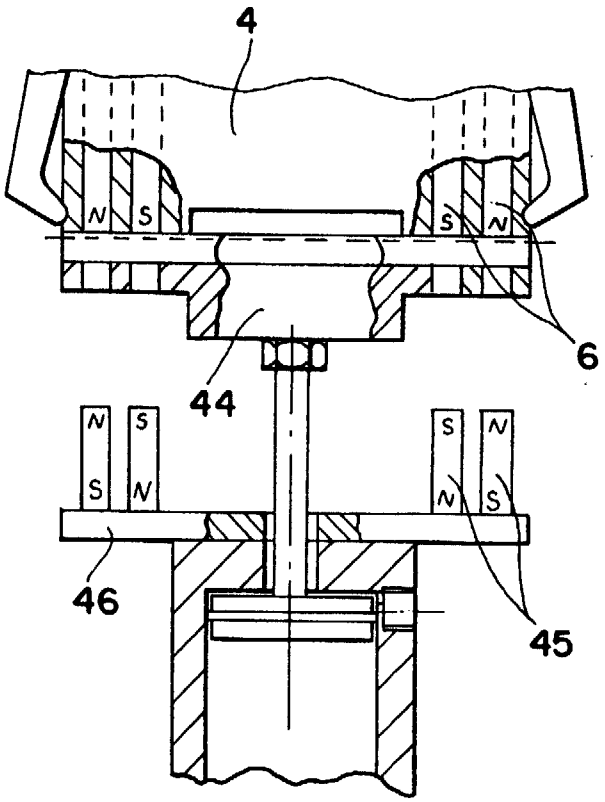
FIG. 7 shows a detailed elevation view of the transferror, after the cylinder raises the base, the tie stock resting to be collected by the magnets of the hanking unit.
Figure 6:
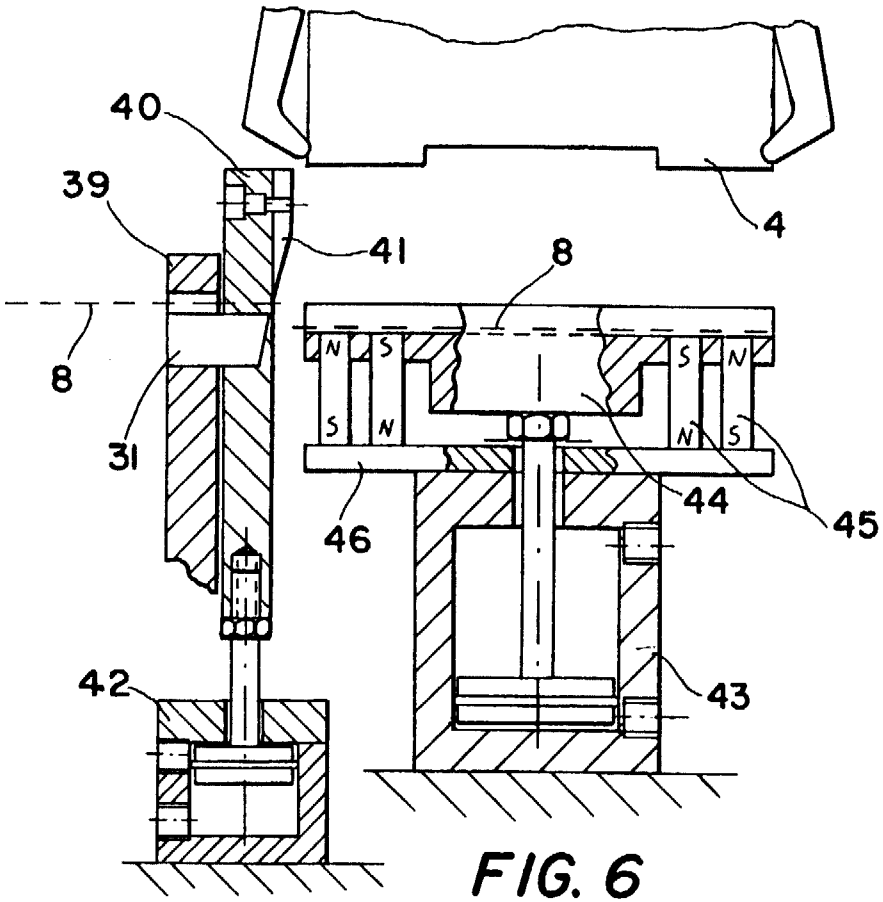
FIG. 6 shows an enlarged detailed elevational view of the transferror, the hanking unit positioned there over with the cut tie stock.
Figure 11:
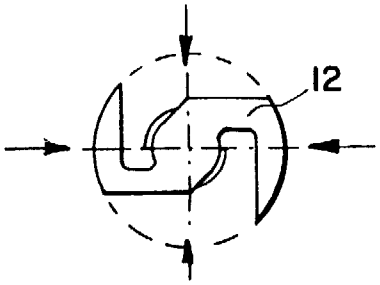
FIG. 11 shows a diagrammatic plan view of the twister.
Figure 12:
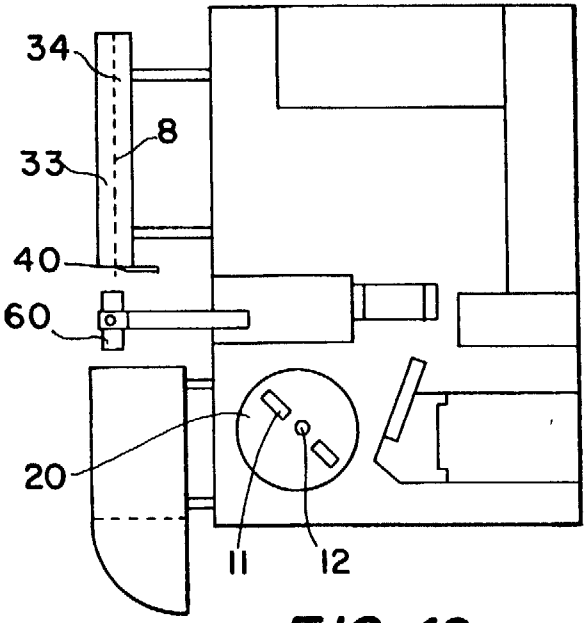
FIG. 12 is a diagrammatic plan illustrating one arrangement of the various components.

The dispenser of tie stock comprises a straightener 33 for the ferrous wire tie stock 8 coming from the reel, guided by a roller 34. The wire passes into a groove of a stop 35 and a carriage. 36, the wire being fastened thereto by a cylinder 38. The ferrous wire (FIG. 5) dispenser includes guide rod 32 positioned between the supports 30 and 39 and guided thereon are the stop and the carriage 36.

From the carriage 36, the ferrous wire 8 is driven t0 a passageway configured by two plates 39 and 40 of the respective mutually orthogonally positioned cutting blades 31 and 41, operating in a straddle way to cause the cutting of the ferrous wire.

The carriage 36 where the ferrous wire is fastened by a cylinder 38 remains linked to a cylinder 37 so that if the latter is activated and the plunger travels then predetermined distance, the supply of the ferrous wire for tying the hank is thus obtained. At the time when the supply of tying ferrous wire was already obtained, the cylinder 42 is activated and movement of the cutting blade 41 onto the ferrous wire at the joint with the blade 31, severs the wire according to the required length, while the wire remains on the transferror unit.

The transferror unit comprises some magnets 45 fixed in the base plate 46, and the ferrous wire resting on upper plate 44 being moved upwardly by a cylinder When said cylinder 43 is activated, the ferrous wire 8 is shifted by the plate 44 and thus transferred to the hanking unit and clamp, and remains fixed to the latter by means of the magnetized members 6.

For this purpose, the hanking unit and clamp had previously been positioned, by means not shown, over the transferror, so that when the cylinder 43 is activated, the ferrous wire is raised by the upper plate 44 and transferred to the banking unit and gripped by the magnets 6. This is so because the transferror magnets 45 are fixed to the base 46 and the ferrous wire remains free for attraction by the magnets 6 of the hanking unit and the wire will then be driven to the wound hank 10 to have the hank tied.

In this way, while the hanking unit is shifted to be positioned above the winding plate to the hank, the dispenser begins then a new cycle to supply new tying ferrous wire up to the transferror, and remarkable time saving is thereby achieved when the two operations are independently and jointly performed.

Figure 8:
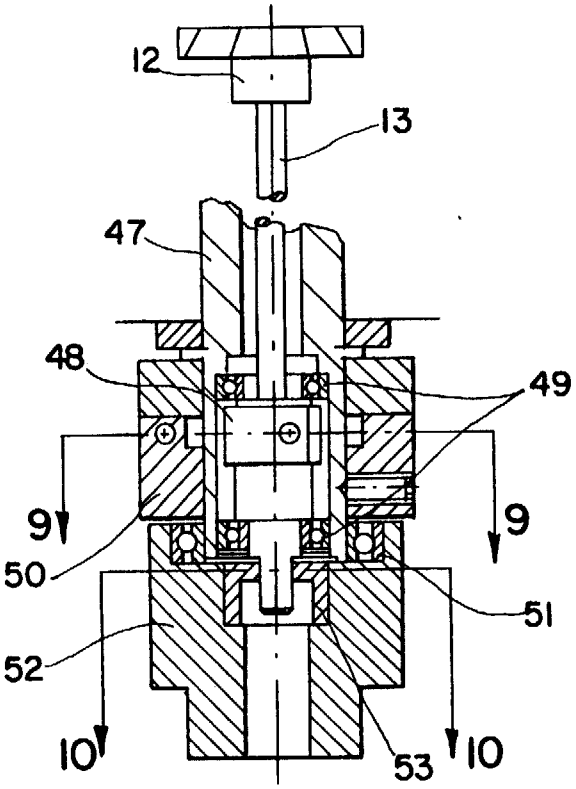
FIG. 8 shows a cross-sectioned view of the tying twister, wherein can be seen how the twister shaft remains concentrically positioned to the winding plate hollow shaft in a way such that an escape wheel with so many teeth as the twister has arms is fixed to the twister shaft.

The hank tying twister (FIG. 8) has a shaft 13 concentric as regards the hollow shaft 47 of the winding plate 20 and an escape wheel 48 supported by bearings 49 with so many teeth as the twister 12 has arms, is fixed to the plate, using a setscrew 57.

A ring 50 has pivoted thereto on pin 55 a trigger 54. The ring is anchored to the shaft 47 of the plate 20 and trigger 54 is engaged with the teeth of the escape wheel 48 being urged by the action of a spring 56.

When the shaft 47 of the winding plate driven by a motor (not shown) is rotating and the trigger 54 is engaged, the holding ring 50 also rotates with the shaft. After the trigger 54 has contacted the escape wheel this wheel uniformly rotates with the plate 20. 20

The escape wheel 48 is also coupled to a cylindrical extension 53 that is slidably interlocked with the motor coupling 52. The coupling has a bearing 51 which in turn houses the hollow shaft 47 to keep the centering 25 between both.

As the braking of the shaft plate is smoothly performed, the twister shaft always stops at a relative position to said plate shaft. The purpose of said device is to stop in a way such that the ends of the tying ferrous wire can easily be located within the twister operating range.

I claim:

1. In a strand hanking apparatus having a winding plate that winds a strand about vertical fingers and delivers a pre cut length of wire over the wound strand that improvement comprising (a) means for supporting a pre cut length of wire, (b) a reciprocating hahking head adjacent said support means having a magnetized lower surface for gripping said wire with ends protruding, (c) rockable clamping arms mounted above and coupled to the hanking head, (d) means for moving the head to pick up the pre cut length of wire from the support means and deliver the wire to the wound strand, (e) means for lowering the head with the pre cut length of wire magnetically affixed thereto to engage the wound strand, (f) means for rocking said arms to engage protruding ends of the wire and locate it partially about the strand and grip the wound strand, and (g) twisting means positioned below the winding plate engaging the terminal portions of the wire to complete a tied hank.

2. In a strand hanking apparatus having a winding plate with wire engaging fingers extending perpendicularly therefrom and means feeding at least a strand to a finger and rotating the plate to wind the strand about the fingers, that improvement comprising (a) means for delivering a pre cut length of ferrous wire onto a magnetized transfer platform, (b) a hanking head, said head having a magnetized lower surface and rockable clamping arms mounted thereabove, (c) means for laterally moving the head from a position over the winding plate to a position over the magnetized transfer platform to pick up the pre cut length of ferrous wire on the magnetized lower surface of the hanking head and return the head to a position over the winding plate, (d) means for rocking the arms to engage the ferrous wire and to move the same about the wound strand and to simultaneously grip the wound strand, and (e) twisting means positioned below the winding plate engaging the ferrous wire to complete a tied hank.

3. A wire winding and typing machine for winding a strand having ends into a hank and then individually tying, comprising:

a hanking head with a pair of clamping arms and a lower face; said lower face including a plurality of magnetic elements;

conveying means for delivering ferrous wire to said lower face, said ferrous wire being magnetically affixed to said lower face;

means for moving said head from said conveying means to said wound strand to deliver the wire, a winding plate having spaced winding fingers and an adjustable clamp adjacent one finger said strand ends remaining fixed to said winding plate, and twisting means for engaging said wire to complete a tied hank.

4. The machine of claim 3, including means for moving the clamping arms for closing the arms together, said arms having protrusions positioning the ferrous wire beneath the wound hank, whereby said ferrous wire is positioned between the hanking head and the hank with downwardly projecting ends.

5. The machine of claim 3, further comprising:

a plurality of L-shaped winding fingers, each with a first portion disposed through said winding plate; second portions of said fingers being spring-biased in a downward direction urging said first portions toward the exterior of the winding plate; and a cylinder disposed adjacent to said second portion to engage said second portion to rock said first portion toward the inside of the winding plate to permit easy removal of a tied shank therefrom.

6. The machine of claim 5, further comprising:

a carriage having a predetermined travel linked to a linear motor means for the supply of tying wire;

a pair of cutting blades proximal to said conveying means capable of cutting said wire;

whereby when the predetermined travel is completed, one of the cutting blades cuts the wire to be transferred to the banking head.

7. The machine of claim 3, wherein the twisting means has a driving shaft which is concentric to a driving shaft of the winding plate; said twister shaft and said winding plate shaft being driven by the same drive means; and an index cam wheel is provided having as many teeth as the twister has arms linked to the shaft of the tying twister; and a trigger is anchored to the shaft of the winding plate and in spring-biased engagement with the index wheel.

* * * * *